(12) United States Patent
Shimizu et al.

(10) Patent No.: US 10,800,478 B2
(45) Date of Patent: Oct. 13, 2020

(54) SWING ARM STRUCTURE FOR SADDLE RIDING ELECTRIC VEHICLE

(71) Applicant: HONDA MOTOR CO., LTD., Minato-Ku, Tokyo (JP)

(72) Inventors: Kenzo Shimizu, Yokohama (JP); Masahiro Yamaguchi, Asaka (JP)

(73) Assignee: Honda Motor Co., Ltd., Tokyo (JP)

( * ) Notice: Subject to any disclaimer, the term of this patent is extended or adjusted under 35 U.S.C. 154(b) by 98 days.

(21) Appl. No.: 15/657,633

(22) Filed: Jul. 24, 2017

(65) Prior Publication Data

US 2018/0037291 A1 Feb. 8, 2018

(30) Foreign Application Priority Data

Aug. 5, 2016 (JP) ................. 2016-154820

(51) Int. Cl.
*B62K 11/04* (2006.01)
*B60G 3/14* (2006.01)
(Continued)

(52) U.S. Cl.
CPC .............. *B62K 11/04* (2013.01); *B62K 25/04* (2013.01); *B62K 25/20* (2013.01); *B62K 25/283* (2013.01);
(Continued)

(58) Field of Classification Search
CPC .... B62K 11/04; B62K 2204/00; B62K 11/10; B60G 3/12; B60G 3/14; B60G 3/145; B60G 2300/12; B62M 7/00; B62M 11/02
See application file for complete search history.

(56) References Cited

U.S. PATENT DOCUMENTS 3,997,043 A 12/1976 Kondo et al.
5,960,901 A * 10/1999 Hanagan ................ B60G 3/145
180/210
(Continued)

FOREIGN PATENT DOCUMENTS

CN 1511752 A 7/2004
CN 101712355 A 5/2010
(Continued)

OTHER PUBLICATIONS

Office Action issued in corresponding Chinese Patent Application No. 201710650563.9 with the English translation thereof and dated Mar. 27, 2019.
(Continued)

*Primary Examiner* — Barry Gooden, Jr.
(74) *Attorney, Agent, or Firm* — Carrier Blackman & Associates, P.C.; Joseph P. Carrier; Jeffrey T. Gedeon

(57) ABSTRACT

A swing arm structure for a saddle riding electric vehicle includes a swing arm pivotably supported by a vehicle body frame at a pivot section and extending rearward from the pivot section to rotatably support a rear wheel, an electric motor that drives the rear wheel, and a speed reduction mechanism that reduces an output of the electric motor and transmit the output to the rear wheel, and a housing installed separately from the swing arm and attached to the swing arm, wherein the speed reduction mechanism and the housing are configured as a speed reduction mechanism unit in which the speed reduction mechanism is attached to the housing and integrated with the housing.

8 Claims, 4 Drawing Sheets

(51) Int. Cl.
*B62K 25/04* (2006.01)
*B62K 25/28* (2006.01)
*B62M 11/02* (2006.01)
*B62M 17/00* (2006.01)
*B62K 25/20* (2006.01)

(52) U.S. Cl.
CPC .......... *B62M 11/02* (2013.01); *B62M 17/00* (2013.01); *B62K 2025/048* (2013.01); *B62K 2204/00* (2013.01)

(56) References Cited

U.S. PATENT DOCUMENTS

| | | | |
|---|---|---|---|
| 6,199,651 B1 | 3/2001 | Gay | |
| 8,371,411 B2* | 2/2013 | Kawaguchi | B62M 7/12 180/220 |
| 8,453,782 B2* | 6/2013 | Kondo | B62M 7/12 180/226 |
| 8,627,915 B2* | 1/2014 | Tsukamoto | B60L 15/20 180/21 |
| 8,651,215 B2* | 2/2014 | Ogura | B06B 1/16 180/291 |
| 8,776,936 B2* | 7/2014 | Mimura | B60K 7/0007 180/220 |
| 9,067,615 B2* | 6/2015 | Kashiwai | B62K 25/28 |
| 2012/0103706 A1* | 5/2012 | Kondo | B62M 7/12 180/65.1 |
| 2014/0015455 A1* | 1/2014 | Yonehana | B60L 11/1851 318/139 |
| 2014/0015656 A1* | 1/2014 | Shimizu | B62J 3/00 340/425.5 |
| 2015/0367907 A1* | 12/2015 | Bland | B62M 7/02 180/216 |
| 2017/0113544 A1* | 4/2017 | Tsujimoto | B62M 11/16 |
| 2019/0263291 A1* | 8/2019 | Shimizu | B62M 7/02 |

FOREIGN PATENT DOCUMENTS

| | | |
|---|---|---|
| CN | 102442378 A | 5/2012 |
| CN | 103140413 A | 6/2013 |
| CN | 103287536 A | 9/2013 |
| CN | 103946108 A | 7/2014 |
| JP | S50-013644 Y | 4/1975 |
| JP | 2004-034835 A | 2/2004 |
| JP | 2004-210072 A | 7/2004 |
| JP | 2008-100609 A | 5/2008 |

OTHER PUBLICATIONS

Office Action issued in the corresponding Chinese Patent Application No. 201710650563.9 with the English translation thereof and dated Aug. 13, 2019.

Office Action issued in the corresponding Japanese Patent Application No. 2016-154820 dated Nov. 12, 2019 with the English translation thereof.

\* cited by examiner

SWING ARM STRUCTURE FOR SADDLE RIDING ELECTRIC VEHICLE

CROSS-REFERENCE TO RELATED APPLICATION

Priority is claimed on Japanese Patent Application No. 2016-154820, filed Aug. 5, 2016, the contents of which are incorporated herein by reference.

BACKGROUND

Field of the Invention

The present invention relates to a swing arm structure for a saddle riding electric vehicle.

Description of Related Art

In the related art, a swing arm structure for a saddle riding electric vehicle is disclosed in, for example, Japanese Unexamined Patent Application, First Publication No. 2004-210072. The structure is obtained by sequentially coupling a housing of a motor, a housing of a speed reducer, a transmission arm and a rear driving apparatus from a forward side to a rearward side. For example, the housing of the speed reducer is coupled to a rear surface of the housing of the motor. A front end portion of the transmission arm is fixed to the housing of the speed reducer by a fixing bolt. A rear end portion of the transmission arm is fixed to the housing of the rear driving apparatus by a fixing bolt.

SUMMARY

However, when the configuration in which the housing of the motor, the housing of the speed reducer, the transmission arm and the rear driving apparatus are coupled is provided, the housing of the speed reducer may be deformed, though the amount thereof may be small, due to a load from a rear wheel. For this reason, problems may occur to some extent in an operation of the speed reducer. Accordingly, there is room for improvement in terms of securing high rigidity in a power unit portion.

An aspect of the present invention is to secure high rigidity in a power unit portion in a swing arm structure for a saddle riding electric vehicle including an electric motor and a speed reduction mechanism that are attached to a swing arm.

A swing arm structure for a saddle riding electric vehicle according to the present invention employs the following configuration.

(1) A swing arm structure for a saddle riding electric vehicle according to an aspect of the present invention includes a swing arm pivotably supported by a vehicle body frame of the saddle riding electric vehicle at a pivot section and extending rearward from the pivot section to rotatably support a rear wheel of the saddle riding electric vehicle; an electric motor attached to the swing arm and that drives the rear wheel; a speed reduction mechanism that reduces an output of the electric motor and transmit the output to the rear wheel, and a housing installed separately from the swing arm and attached to the swing arm, wherein the speed reduction mechanism and the housing are configured as a speed reduction mechanism unit in which the speed reduction mechanism is attached to the housing and integrated with the housing.

(2) In the aspect of the above mentioned (1), the electric motor may be disposed in front of the rear wheel.

(3) In the aspect of the above mentioned (1) or (2), the electric motor and the speed reduction mechanism unit may be configured as a drive unit in which the electric motor is attached to the housing and integrated with the housing together with the speed reduction mechanism.

(4) In the aspect of the above mentioned (3), the drive unit may be detachably attached to the swing arm.

(5) In the aspect of the above mentioned (3) or (4), the drive unit may be disposed in front of an arm section of the swing arm extending from the pivot section toward a rear wheel support mechanism.

(6) In the aspect of any one of the above mentioned (3) to (5), the drive unit may be accommodated and attached to the swing arm, and a lid that opens and closes an opening for accommodating the drive unit may be installed on an upper surface of the swing arm.

(7) In the aspect of any one of the above mentioned (1) to (6), a drive shaft that transmits a force from the speed reduction mechanism to the rear wheel may be further provided, and the swing arm may include an arm section that passes through the drive shaft.

(8) In the aspect of the above mentioned (7), a cross section of the arm section crossing a longitudinal direction may have a closed annular shape.

(9) In the aspect of any one of the above mentioned (1) to (8), a rotation axis of the electric motor may extend in a vehicle forward/rearward direction.

(10) In the aspect of any one of the above mentioned (1) to (9), the rotation axis of the electric motor may be disposed at a center of the vehicle in a vehicle width direction.

(11) In the aspect of any one of the above mentioned (1) to (10), when a straight line passing through the pivot section and an axle of the rear wheel may be set as a swing arm centerline in a side view, the rotation axis of the electric motor may overlap with the swing arm centerline in the side view.

According to the aspect of the above mentioned (1), as the speed reduction mechanism and the housing are configured as a speed reduction mechanism unit in which the speed reduction mechanism is attached to the housing and integrated with the housing, the swing arm portion that requires moderate deflection and the power unit portion that requires high rigidity to stabilize the drive system rotary shaft can be provided as separate structures. For this reason, a rigidity in the swing arm portion and a rigidity in the power unit portion can be set separately. Accordingly, high rigidity in the power unit portion can be secured. In addition, since the swing arm portion can have a moderate deflection, the rigidity necessary for the power unit portion and the swing arm portion can be secured. In addition, even when the housing is filled with a working fluid, the speed reduction mechanism unit is not easily influenced by the deformation of the swing arm portion due to a load from the rear wheel according to a road surface input or the like during traveling. For this reason, leakage of the working fluid outside of the vehicle can be avoided and oil sealability can be secured. In addition, during assembly of the vehicle, assembly in the vehicle can be easily performed by assembling the speed reduction mechanism unit first. In addition, when the speed reduction mechanism unit is detachably attached to the swing arm, during maintenance of a completed vehicle, since only the speed reduction mechanism unit can be removed without disassembling the swing arm, work can be easily performed.

According to the aspect of the above mentioned (2), as the electric motor is disposed in front of the rear wheel, since the electric motor is disposed in the vicinity of the pivot section, an inertial mass of the undercarriage parts around the pivot section can be reduced. For this reason, the operability of the rear suspension can be improved. In addition, the electric motor is disposed in the vicinity of the center of the vehicle, which is advantageous for weight distribution. In addition, the final gear case of the rear wheel at a side portion in the vehicle width direction can be reduced in size. Accordingly, since the final gear case cannot easily come into contact with the ground during traveling along a road bank, a bank angle of the vehicle can be improved.

According to the aspect of the above mentioned (3), as the electric motor and the speed reduction mechanism unit are configured as the drive unit in which the electric motor is attached to the housing and integrated with the housing together with the speed reduction mechanism, the drive unit cannot easily receive an influence of deformation of the swing arm portion due to a load from the rear wheel according to a road surface input or the like during traveling. In addition, during assembly of the vehicle, assembly in the vehicle can be easily performed by assembling the drive unit first.

According to the aspect of the above mentioned (4), as the drive unit is detachably attached to the swing arm, during maintenance of a completed vehicle, since only the drive unit can be removed without disassembling the swing arm, work can be easily performed.

According to the aspect of the above mentioned (5), as the drive unit is disposed in front of the arm section of the swing arm extending from the pivot section toward the rear wheel support mechanism, since the drive unit is disposed in a portion having a large cross-sectional area on a front side of the swing arm, in comparison with the case in which the drive unit is disposed behind the arm section, a negative influence on rigidity of the swing arm can be reduced.

According to the aspect of the above mentioned (6), as the lid that opens and closes the opening for accommodating the drive unit is installed on the swing arm, maintenance work on a completed vehicle can be easily performed by opening and closing the lid. In addition, even when the housing is filled with a working fluid, spilling of the working fluid outside of the vehicle can be avoided even if the lid is opened for maintenance.

According to the aspect of the above mentioned (7), as the swing arm includes the arm section that passes through the drive shaft, since the arm section can have moderate deflection, the rigidity required for the power unit portion and the arm section can be secured.

According to the aspect of the above mentioned (8), as the cross section of the arm section crossing the longitudinal direction has the closed annular shape, even when the arm section is deformed by a load from the rear wheel due to a road surface input or the like during traveling, uniform deformation can be generated. Accordingly, the steering stability can be stably adjusted by appropriately setting the rigidity of the arm section.

According to the aspect of the above mentioned (9), as the rotation axis of the electric motor extends in the vehicle forward/rearward direction, the output of the electric motor can be transmitted to the drive shaft without changing the rotation direction of the electric motor.

According to the aspect of the above mentioned (10), as the rotation axis of the electric motor is disposed at the center of the vehicle in the vehicle width direction, a weight distribution in the vehicle width direction is made favorable.

According to the aspect of the above mentioned (11), as the rotation axis of the electric motor overlaps with the swing arm centerline when seen in a side view, since a center of gravity of the suspension system including the electric motor is disposed on the swing arm centerline, operability of the suspension system can be improved. In addition, since swelling of the electric motor in the upward/downward direction can be suppressed, the swing arm can be reduced in size.

DETAILED OF EMBODIMENTS

Figure 1:
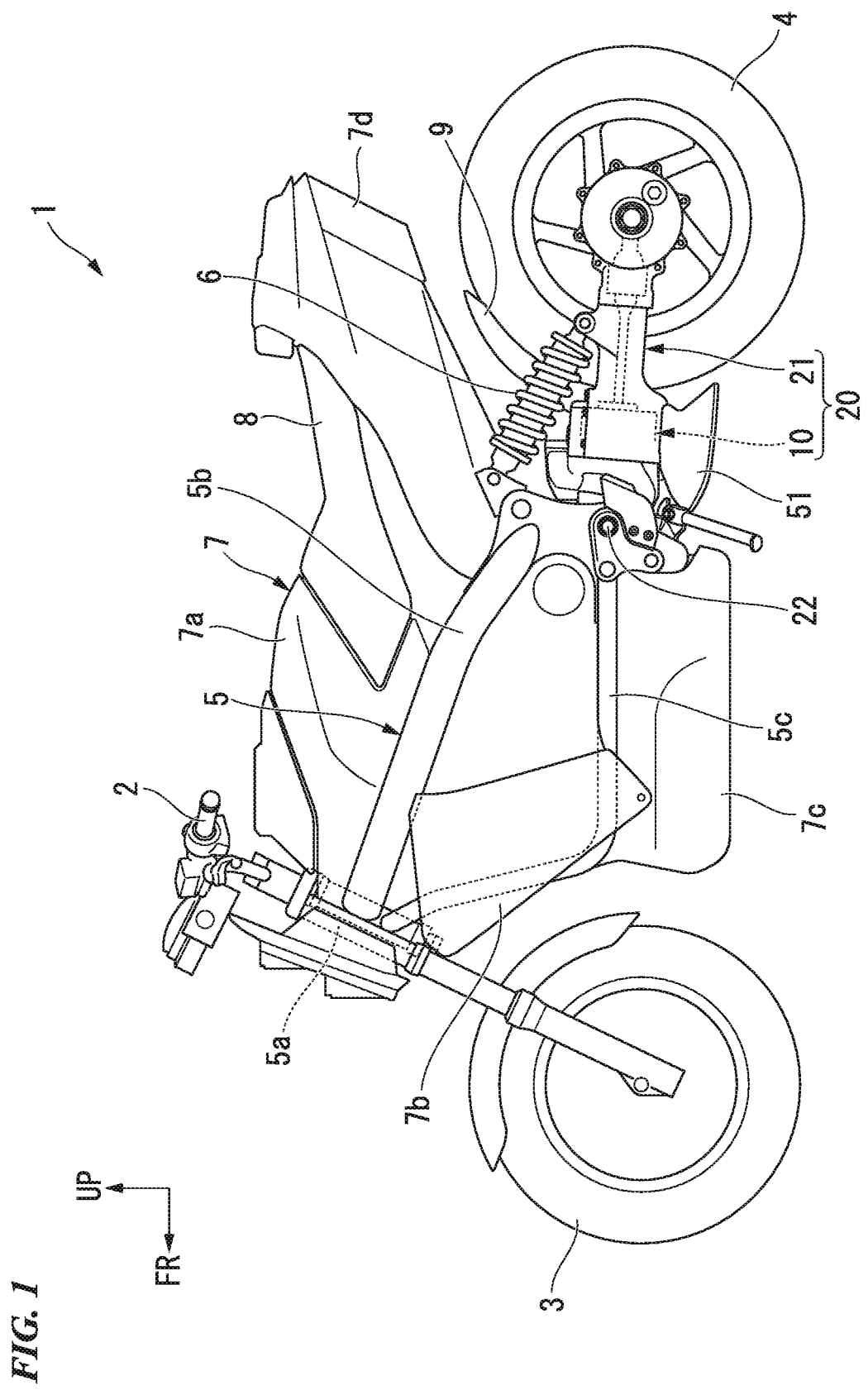
FIG. 1 is a left side view of a motorcycle according to an embodiment.

Hereinafter, an embodiment of the present invention will be described with reference to the accompanying drawings. Further, directions of forward, rearward, left, right, and so on, described below are the same as directions in a vehicle described below unless the context clearly indicates otherwise. In addition, in appropriate places in the drawings used in the following description, an arrow FR showing a forward direction with respect to a vehicle, an arrow LH showing a leftward direction with respect to the vehicle and an arrow UP showing an upward direction with respect to the vehicle are provided.

<Entire Vehicle>

FIG. 1 shows a motorcycle 1 serving as an example of a saddle riding electric vehicle. Referring to FIG. 1, the motorcycle 1 includes a front wheel 3 steered by a handle 2, and a rear wheel 4 driven by a drive unit 10 including an electric motor 11 (see FIG. 4). Hereinafter, the motorcycle 1 is simply referred to as "a vehicle."

Steering system parts including the handle 2 and the front wheel 3 steerably pivot on a head pipe 5a formed on a front end portion of a vehicle body frame 5. A handle steering shaft (not shown) connected to the handle 2 is inserted through the head pipe 5a. At a rear section of the vehicle body frame 5, a swing arm 21 to which the drive unit 10 is attached is pivotably supported such that the swing arm 21 is vertically swingable about a pivot shaft 22. A rear suspension 6 is interposed between the front section of the swing arm 21 and the rear section of the vehicle body frame 5.

For example, the vehicle body frame 5 is formed by integrally coupling a plurality of kinds of steel members through welding or the like. The vehicle body frame 5 includes a pair of left and right main frames 5b extending from a vertical center section of the head pipe 5a toward a rear lower side and then extending by being bent downward, a pair of left and right lower frames 5c extending to be inclined slightly downward such that they are disposed further backward as they get lower from a lower section of the head pipe 5a, and then extending by being bent rearward to be connected to rear lower sections of the left and right main frames 5b, and a cross member (not shown) extending in a vehicle width direction such that the left and right main frames 5b are connected and the left and right lower frames 5c are connected.

The vehicle body frame 5 is covered with a vehicle body cover 7. The vehicle body cover 7 includes an upper cowl 7a that covers an upper section of the vehicle body frame 5, a front side cowl 7b that covers a side portion of a front section of the vehicle body frame 5, an under cowl 7c that covers a lower section of the vehicle body frame 5, and a rear cowl 7d that covers a rear section of the vehicle body frame 5. Further, reference numeral 8 in the drawings designates a seat on which an occupant sits, and reference numeral 9 in the drawings designates a rear fender that covers a front upper section of the rear wheel 4.

In the embodiment, a power generation system configured to exchange chemical energy with electric energy using a chemical reaction between hydrogen and oxygen is employed. While not shown, a fuel cell stack, a hydrogen tank, a hydrogen supply system, a battery, an inverter, a power drive unit (PDU) configured to control a flow of electricity, a vehicle control unit (VCU) configured to control components of the vehicle, and so on, are attached to the vehicle body frame 5.

The hydrogen supply system supplies hydrogen stored in the hydrogen tank into the fuel cell stack. The fuel cell stack generates electricity using the supplied hydrogen and oxygen in external air. The electricity is provided for charging of the battery and is supplied to the inverter and electric equipment (not shown). The inverter electrically generates alternating current power from direct current power supplied from at least one of the fuel cell stack and the battery. The electric motor 11 is driven and rotated by the alternating current power generated by the inverter to drive the rear wheel 4.

<Swing Arm Structure>

Figure 2:
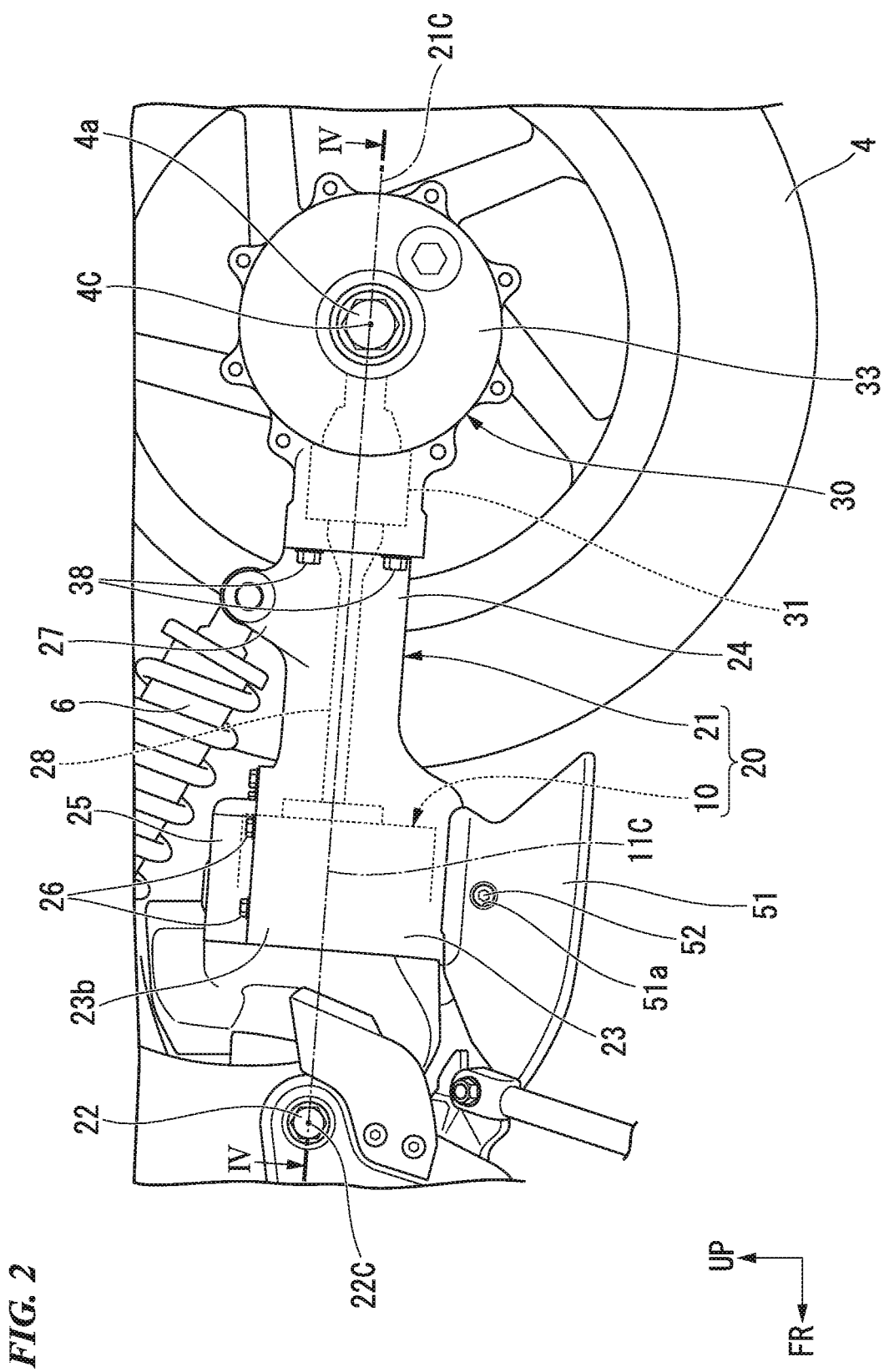
FIG. 2 is a left side view of a swing arm structure according to the embodiment.

As shown in FIG. 2, a swing arm structure 20 includes the swing arm 21 pivotably supported by the vehicle body frame 5 (see FIG. 1) at a pivot section 22a (see FIG. 3) and extending rearward from the pivot section 22a to rotatably support the rear wheel 4, the electric motor 11 (see FIG. 4) attached to the swing arm 21 and configured to drive the rear wheel 4, a speed reduction mechanism 12 (see FIG. 4) configured to reduce the output of the electric motor 11 and transmit the output to the rear wheel 4, a rear wheel support mechanism 30 that rotatably supports an axle 4a (hereinafter, referred to as "a rear wheel axle 4a") of the rear wheel 4, a housing 40 (see FIG. 3) installed separately from the swing arm 21 and attached to the swing arm 21, and a drive shaft 28 that transmits a force from the speed reduction mechanism 12 to the rear wheel 4.

Figure 3:
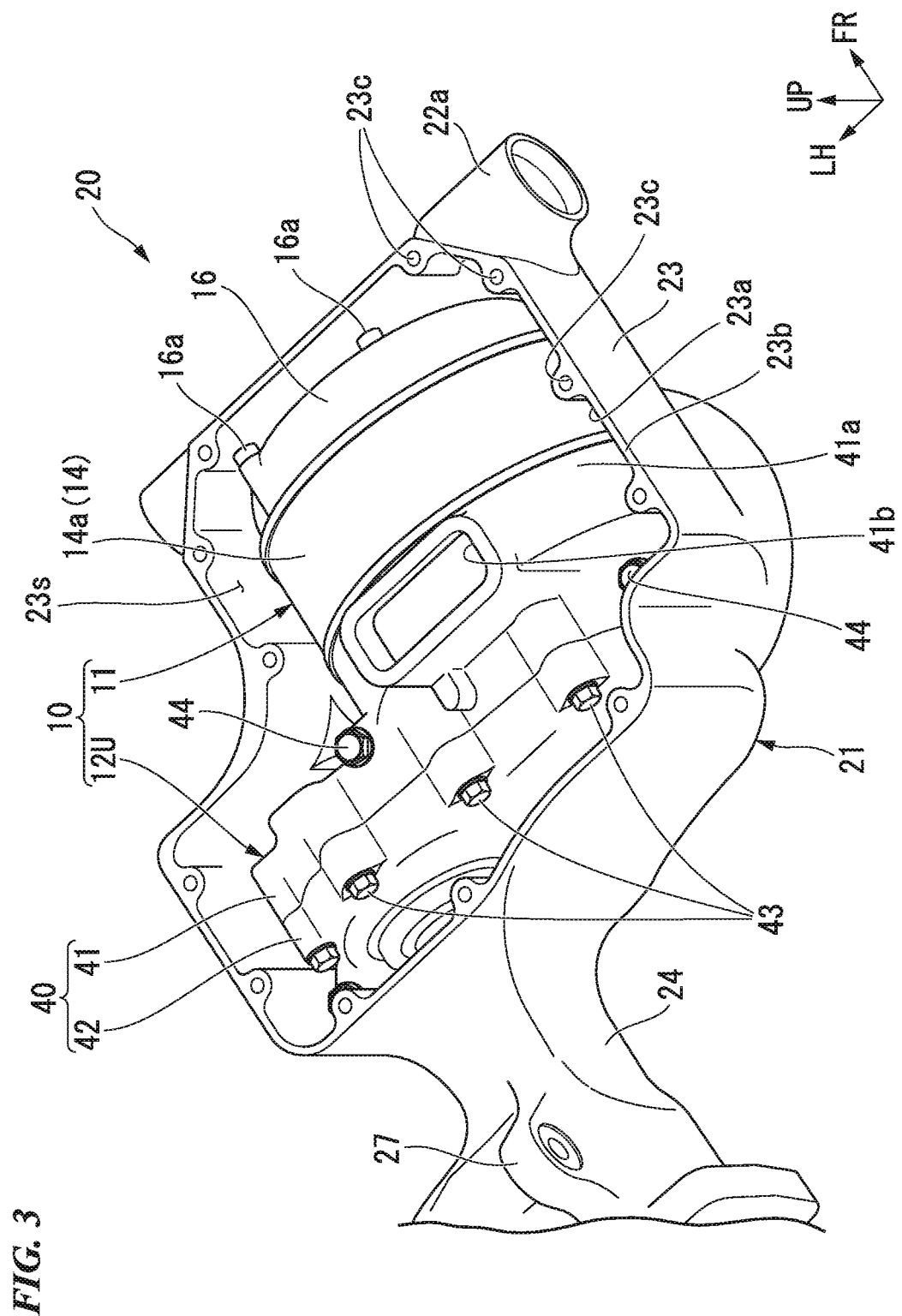
FIG. 3 is a perspective view of the swing arm structure of the embodiment when seen from a right upper rear side.

As shown in FIG. 3, the speed reduction mechanism 12 (see FIG. 4) and the housing 40 are configured as a speed reduction mechanism unit 12U in which the speed reduction mechanism 12 is attached to the housing 40 and integrated with the housing 40. Further, in the electric motor 11 and the speed reduction mechanism unit 12U, the electric motor 11 is attached to the housing 40 together with the speed reduction mechanism 12 to provide an integrated drive unit 10.

<Swing Arm>

Figure 4:
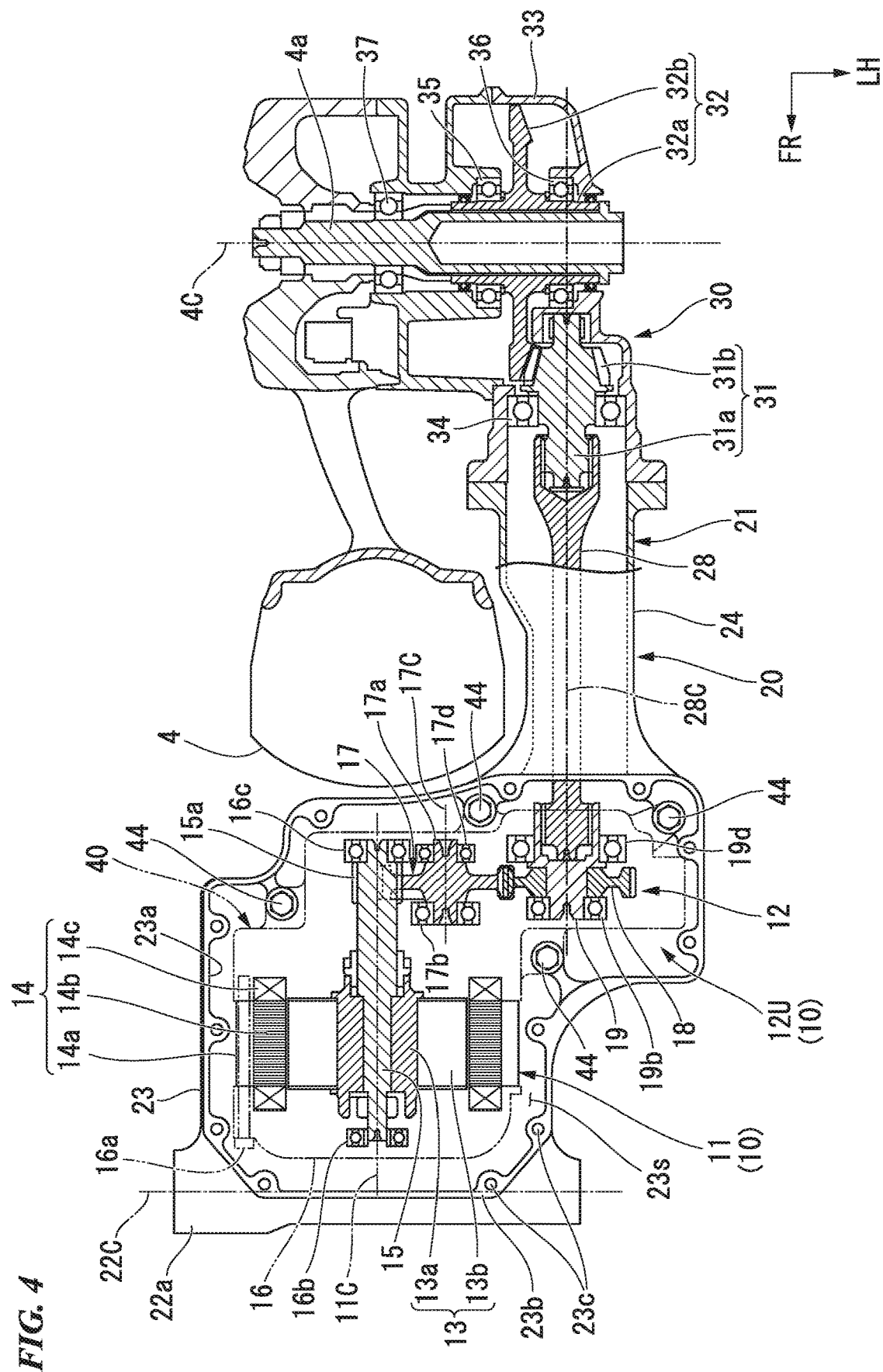
FIG. 4 is a view including a cross section taken along line IV-IV of FIG. 2.

As shown in FIG. 4, the swing arm 21 includes a unit accommodating section 23 disposed in front of the rear wheel 4 and having an opening 23a for accommodating the drive unit 10, and an arm section 24 disposed on a left side of the rear wheel 4 and passing through the drive shaft 28. Further, the unit accommodating section 23 and the arm section 24 are integrally formed of the same member. Reference numeral 28C in the drawings designates a shaft axis serving as a central axis of the drive shaft 28.

The opening 23a of the unit accommodating section 23 opens upward. The pivot section 22a formed in a tubular shape extending in the vehicle width direction is installed at a front end portion of the unit accommodating section 23. When seen in a cross-sectional view of FIG. 4, the unit accommodating section 23 has an L-shaped box shape extending rearward from the pivot section 22a and then bending toward a left side. When seen in a cross-sectional view of FIG. 4, a portion of the rear wall of the unit accommodating section 23 opposite to a tire of the rear wheel 4 has an arc shape along the contour of the tire. Further, reference numeral 22C in the drawings designates a pivot axis serving as a central axis of the pivot section 22a.

The arm section 24 has a tubular shape extending forward and rearward. The arm section 24 extends from the pivot section 22a (specifically, the unit accommodating section 23 behind the pivot section 22a) toward the rear wheel support mechanism 30. When seen in a cross-sectional view of FIG. 4, a portion of an inner section of the arm section 24 in the vehicle width direction opposite to the tire of the rear wheel 4 has an arc shape extending along the contour of the tire and is smoothly continuous with the rear wall of the unit accommodating section 23. When seen in a cross-sectional view of FIG. 4, an outer section of the arm section 24 in the vehicle width direction has an arc shape symmetrical to a shape of the inner section in the vehicle width direction and smoothly continuous with the rear wall of the unit accommodating section 23. A cross section perpendicular to (crossing) the longitudinal direction of the arm section 24 has a closed annular shape.

As shown in FIG. 2, a lid 25 configured to open and close the opening 23a (see FIG. 3) of the unit accommodating section 23 is installed on an upper surface of the swing arm 21. The lid 25 is attached to an opening forming section 23b (a sidewall section) of the unit accommodating section 23 by a plurality of (in FIG. 2, only four are shown) bolts 26. A plurality of (for example, 12 in the embodiment) screw holes 23c (see FIG. 3) into which the bolts 26 are screwed are formed in the opening forming section 23b. Further, reference numeral 27 in the drawings designates a rear suspension lower support section configured to pivotably support a lower end portion of the rear suspension 6.

<Electric Motor>

The electric motor 11 is disposed in front of the rear wheel. The electric motor 11 is an inner rotor type motor. As shown in FIG. 4, the electric motor 11 includes an inner rotor 13, and a stator 14 supported by the housing 40. A rotation axis (hereinafter, referred to as "a motor axis 11C") of the electric motor 11 extends in the vehicle forward/rearward direction. The motor axis 11C is disposed at a center of the vehicle in the vehicle width direction.

The inner rotor 13 includes a tubular inner rotor main body 13a, and a magnet 13b installed on an outer circumferential surface of the inner rotor main body 13a. An inner circumferential surface of the inner rotor main body 13a is spline-coupled to a motor output shaft 15 that forms the motor axis 11C.

The stator 14 includes an annular stator yoke 14a, a plurality of teeth 14b joined to the stator yoke 14a and radially installed around the motor axis 11C, and a coil 14c formed by winding a conducting wire on the teeth 14b. The stator yoke 14a is fixed to the housing 40 by a plurality of (in FIG. 4, only one is shown) bolts 16a. The electric motor 11 is supported by the housing 40 in a state in which an outer circumferential surface of the stator yoke 14a is exposed to the inside of the unit accommodating section 23. Further, reference numeral 16 in the drawings designate a cup-shaped motor cover configured to cover a front side of the electric motor 11.

A bearing 16b that rotatably supports one end portion (a front end portion) of the motor output shaft 15 is installed at a center section of the motor cover 16 in the radial direction. A bearing 16c configured to rotatably support the other end portion (a rear end portion) of the motor output shaft 15 is installed on a rear wall of the housing 40.

When seen in a side view of FIG. 2, a straight line passing through the pivot axis 22C (the pivot section 22a shown in FIG. 3) and a central axis 4C of the rear wheel axle 4a (the rear wheel axle 4a) is set as "a swing arm centerline 21C." When seen in a side view of FIG. 2, the motor axis 11C overlaps the swing arm centerline 21C.

<Speed Reduction Mechanism>

As shown in FIG. 4, the speed reduction mechanism 12 is disposed behind the inner rotor 13 and disposed in front of the rear wheel 4. The speed reduction mechanism 12 includes a pinion 15a formed integrally with the rear end portion of the motor output shaft 15, a first speed reduction gear 17 engaged with the pinion 15a, a second speed reduction gear 18 engaged with the first speed reduction gear 17, and a shaft support section 19 configured to rotate with the second speed reduction gear 18. The pinion 15a, the first speed reduction gear 17 and the second speed reduction gear 18 are sequentially arranged from the inside in the vehicle width direction toward the outside in the vehicle width direction.

The first speed reduction gear 17 includes a gear shaft 17a having an axis 17C parallel to the motor output shaft 15 and the drive shaft 28. A front rear end portion of the gear shaft 17a is rotatably supported by bearings 17b and 17d installed in the housing 40.

The shaft support section 19 is disposed coaxially with the drive shaft 28. A rear section of the shaft support section 19 has a tubular shape. An inner circumferential surface of the rear section of the shaft support section 19 is spline-coupled to the front end portion of the drive shaft 28. The front end portion and the rear section of the shaft support section 19 are rotatably supported by bearings 19b and 19d installed in the housing 40.

<Rear Wheel Support Mechanism>

As shown in FIG. 4, the rear wheel support mechanism 30 is disposed on a left side of the rear wheel 4. The rear wheel support mechanism 30 includes a third speed reduction gear 31 having a front end portion coupled to the rear end portion of the drive shaft 28, a final gear 32 engaged with the third speed reduction gear 31, and a final gear case 33 that accommodates the third speed reduction gear 31 and the final gear 32.

The third speed reduction gear 31 includes a gear shaft 31a disposed coaxially with the drive shaft 28. The inner circumferential surface of the rear end portion of the drive shaft 28 having a tubular shape is spline-coupled to the front end portion of the gear shaft 31a. A bevel gear 31b engaged with the final gear 32 is installed on the rear section of the gear shaft 31a. A forward/rearward center section of the gear shaft 31a is rotatably supported by a bearing 34 installed on the final gear case 33.

The final gear 32 includes a gear shaft 32a having a tubular shape disposed coaxially with the rear wheel axle 4a, and a bevel gear 32b engaged with the third speed reduction gear 31. The inner circumferential surface of the gear shaft 32a is spline-coupled to the outer circumferential surface of the rear wheel axle 4a. The inner section in the vehicle width direction and the outer section in the vehicle width direction of the gear shaft 32a are rotatably supported by bearings 35 and 36 installed on the final gear case 33.

According to the configuration, rotation of the motor output shaft 15 is reduced by a predetermined reduction ratio and transmitted to the rear wheel axle 4a.

Further, reference numeral 37 in the drawings designates a bearing interposed between the rear wheel axle 4a and the final gear case 33. Reference numeral 38 in the drawings designates a bolt configured to fasten and fix the rear end portion of the arm section 24 to the front end portion of the final gear case 33.

<Housing>

As shown in FIG. 3, the housing 40 includes a first housing half body 41 that accommodates the front section of the speed reduction mechanism 12, and a second housing half body 42 that accommodates the rear section of the speed reduction mechanism 12 and coupled to the first housing half body 41.

A stator support section 41a protruding forward from the inside of the first housing half body 41 in the vehicle width direction and configured to support the stator 14 is installed on the first housing half body 41. A terminal connecting section 41b opening upward and downward is formed on an upper section of the first housing half body 41. For example, a terminal (not shown) or the like of a wiring configured to supply power to the electric motor 11 is connected to the terminal connecting section 41b.

The second housing half body 42 is fixed to the first housing half body 41 by a plurality of (in FIG. 3, only four are shown) bolts 43.

<Drive Unit>

The drive unit 10 is disposed in front of the arm section 24 of the swing arm 21. The drive unit 10 is attached to the swing arm 21 to accommodate the swing arm 21. The drive unit 10 is detachably attached to the swing arm 21. The drive unit 10 is attached to the swing arm 21 while having a plurality of (in FIG. 4, only four are shown) bolts 44 passing through the housing 40 and being fastened to the unit accommodating section 23.

For example, the drive unit 10 can be removed from the swing arm 21 by removing the lid 25 (see FIG. 2) bolt-fastened to the opening forming section 23b of the unit accommodating section 23 in order to open the opening 23a of the unit accommodating section 23, removing the bolts 44 fastened to the unit accommodating section 23 and releasing coupling of the drive shaft 28. Further, reference numeral 23s in the drawings designates a gap formed between the inner wall of the unit accommodating section 23 and the drive unit 10.

<Speed Reduction Mechanism Unit>

The speed reduction mechanism unit 12U is detachably attached to the swing arm 21. For example, in a state in which the drive unit 10 is removed from the swing arm 21, the speed reduction mechanism unit 12U can be removed from the swing arm 21 by removing the motor cover 16 bolt-fastened to the housing 40 together with the stator yoke 14a and removing the electric motor 11 from the housing 40.

As described above, the swing arm structure 20 of the saddle riding electric vehicle 1 of the embodiment includes the swing arm 21 pivotably supported by the vehicle body frame 5 of the saddle riding electric vehicle 1 at the pivot section 22a and extending rearward from the pivot section 22a to rotatably support the rear wheel 4 of the saddle riding electric vehicle 1, the electric motor 11 attached to the swing arm 21 and that drives the rear wheel 4, the speed reduction mechanism 12 that reduces the output of the electric motor 11 and transmit the output to the rear wheel 4, and the housing 40 installed separately from the swing arm 21 and attached to the swing arm 21, wherein the speed reduction mechanism 12 and the housing 40 are configured as the speed reduction mechanism unit 12U in which the speed reduction mechanism 12 is attached to the housing 40 and integrated with the housing 40.

According to the above-mentioned configuration, as the speed reduction mechanism 12 and the housing 40 are provided as the speed reduction mechanism unit 12U in which the speed reduction mechanism 12 is attached to the housing 40 and integrated with the housing 40, a swing arm portion (i.e., the arm section 24) that requires moderate deflection and a power unit portion (i.e., the drive unit 10) that requires high rigidity to stabilize a drive system rotary shaft can be provided as separate structures. For this reason, a rigidity of the swing arm portion and a rigidity of the power unit portion can be set differently. Accordingly, high rigidity in the power unit portion can be secured. In addition, since the swing arm portion can have a moderate deflection, the rigidity required for the power unit portion and the swing arm portion can be secured. In addition, even when the housing 40 is filled with a working fluid, the speed reduction mechanism unit 12U does not easily receive an influence of the deformation of the swing arm portion due to a load from the rear wheel 4 according to a road surface input or the like during traveling. For this reason, leakage of the working fluid outside of the vehicle can be avoided, and oil sealability can be secured. In addition, during assembly of the vehicle, assembly in the vehicle can be easily performed by assembling the speed reduction mechanism unit 12U first. In addition, as the speed reduction mechanism unit 12U is detachably attached to the swing arm 21, during maintenance of a completed vehicle, since only the speed reduction mechanism unit 12U can be removed without disassembling the swing arm 21, work can be easily performed.

In addition, in the swing arm structure 20 of the saddle riding electric vehicle 1 of the embodiment, as the electric motor 11 is disposed in front of the rear wheel 4, since the electric motor 11 is disposed in the vicinity of the pivot section 22a, an inertial mass of undercarriage parts around the pivot section 22a can be reduced. For this reason, operability of the rear suspension 6 can be improved. In addition, the electric motor 11 is disposed in the vicinity of a center of the vehicle, which is advantageous for weight distribution. In addition, the final gear case 33 of the rear wheel 4 at a side portion in the vehicle width direction can be reduced in size. Accordingly, since the final gear case 33 cannot easily come into contact with the ground during traveling along a road bank, a bank angle of the vehicle can be improved.

In addition, in the swing arm structure 20 of the saddle riding electric vehicle 1 of the embodiment, as the electric motor 11 and the speed reduction mechanism unit 12U are provided as the drive unit 10 in which the electric motor 11 is attached to the housing 40 and integrated with the housing 40 together with the speed reduction mechanism 12, the drive unit 10 cannot easily receive an influence of deformation of the swing arm portion due to the load from the rear wheel 4 according to the road surface input or the like during traveling. In addition, during assembly of the vehicle, assembly in the vehicle can be easily performed by assembling the drive unit first 10.

In addition, in the swing arm structure 20 of the saddle riding electric vehicle 1 of the embodiment, as the drive unit 10 is detachably attached to the swing arm 21, during maintenance of a completed vehicle, since only the drive unit 10 can be removed without disassembling the swing arm 21, work can be easily performed.

In addition, in the swing arm structure 20 of the saddle riding electric vehicle 1 of the embodiment, as the drive unit 10 is disposed in front of the arm section 24 of the swing arm 21 extending from the pivot section 22a toward the rear wheel support mechanism 30, since the drive unit 10 is disposed in a portion having a large cross-sectional area in front of the swing arm 21, in comparison with the case in which the drive unit 10 is disposed behind the arm section 24, a negative influence on rigidity of the swing arm 21 can be reduced.

In addition, in the swing arm structure 20 of the saddle riding electric vehicle 1 of the embodiment, as the lid 25 that opens and closes the opening 23a for accommodating the drive unit 10 is installed on the upper surface of the swing arm 21, maintenance work on a completed vehicle can be easily performed by opening and closing the lid 25. In addition, even when the housing 40 is filled with a working fluid, spilling of the working fluid out of the vehicle can be avoided even when the lid 25 is opened for maintenance.

In addition, in the swing arm structure 20 of the saddle riding electric vehicle 1 of the embodiment, as the swing arm 21 includes the arm section 24 that passes through the drive shaft 28, since the arm section 24 may have moderate deflection, the rigidity required for the power unit portion and the arm section 24 can be secured.

In addition, in the swing arm structure 20 of the saddle riding electric vehicle 1 of the embodiment, as a cross section of the arm section 24 crossing the longitudinal direction has a closed annular shape, even when the arm section 24 is deformed by the load from the rear wheel 4 due to the road surface input or the like during traveling, uniform deformation can be generated. Accordingly, steering stability can be stably adjusted by appropriately setting the rigidity of the arm section 24.

In addition, in the swing arm structure 20 of the saddle riding electric vehicle 1 of the embodiment, as the motor axis 11C extends in the vehicle forward/rearward direction, the output of the electric motor 11 can be transmitted from the electric motor 11 to the drive shaft 28 without changing the rotation direction.

In addition, in the swing arm structure 20 of the saddle riding electric vehicle 1 of the embodiment, as the motor axis 11C is disposed at a center of the vehicle in the vehicle width direction, a weight distribution in the vehicle width direction becomes favorable.

In addition, in the swing arm structure 20 of the saddle riding electric vehicle 1 of the embodiment, as the motor axis 11C overlaps with the swing arm centerline 21C when seen in a side view, since a center of gravity of a suspension system including the electric motor 11 is disposed on the swing arm centerline 21C, operability of the suspension system can be improved. In addition, since swelling of the electric motor 11 in the upward/downward direction can be suppressed, the swing arm 21 can be reduced in size.

Further, in the swing arm structure 20 of the saddle riding electric vehicle 1 of the embodiment, while the motorcycle 1 including the drive unit 10 having the electric motor 11 has been exemplarily described as an example of the saddle riding electric vehicle, there is no limitation thereto. For example, a saddle riding hybrid vehicle in which an engine is mounted on a vehicle body side may be provided.

In addition, in the swing arm structure 20 of the saddle riding electric vehicle 1 of the embodiment, while a cantilever type swing arm in which the arm section 24 of the swing arm 21 is disposed on only one side (only a left side) of the rear wheel 4 in the vehicle width direction has been exemplarily described, there is no limitation thereto. For example, the swing arm may be a double-supported beam type swing arm in which the arm sections of the swing arm are disposed on both sides of the rear wheel in the vehicle width direction.

Further, the present invention is not limited to the embodiment and, for example, all vehicles in which a driver rides across the vehicle body are included as the saddle riding electric vehicle, and in addition to a motorcycle (including a motorized bicycle and a scooter type vehicle), three-wheeled vehicles (including a two-front-wheeled and one-rear-wheeled vehicle in addition to a one-front-wheeled and two-rear-wheeled vehicle) or four-wheeled vehicles are also included.

Thus, the configuration of the embodiment is an example of the present invention, and various modifications such as substitution of the components of the embodiment with known components may be made without departing from the scope of the present invention.

What is claimed is:

1. A swing arm structure for a saddle riding electric vehicle comprising:
    a swing arm pivotably supported by a vehicle body frame of the saddle riding electric vehicle at a pivot section and extending rearward from the pivot section to rotatably support a rear wheel of the saddle riding electric vehicle;
    an electric motor attached to the swing arm and that drives the rear wheel;
    a speed reduction mechanism that reduces an output of the electric motor and transmits the output to the rear wheel, and
    a housing that is installed separately from the swing arm, that accommodates an entirety of both the electric motor and the speed reduction mechanism, and that is attached to the swing arm,
    wherein the speed reduction mechanism and the housing are configured as a speed reduction mechanism unit in which the speed reduction mechanism is attached to the housing and integrated with the housing,
    wherein the electric motor and the speed reduction mechanism unit are configured as a drive unit in which the electric motor and the speed reduction mechanism are attached to the housing and the electric motor and the speed reduction mechanism are integrated with each other,
    wherein the drive unit is disposed in front of an arm section of the swing arm extending from the pivot section toward a rear wheel support mechanism,
    wherein the drive unit is accommodated and attached to the swing arm, and
    wherein a lid that opens and closes an opening for accommodating the drive unit is installed on an upper surface of the swing arm.

2. The swing arm structure for the saddle riding electric vehicle according to claim 1,
    wherein the electric motor is disposed in front of the rear wheel.

3. The swing arm structure for the saddle riding electric vehicle according to claim 1,
    wherein the drive unit is detachably attached to the swing arm.

4. The swing arm structure for the saddle riding electric vehicle according to claim 1,
    wherein a rotation axis of the electric motor extends in a vehicle forward/rearward direction.

5. The swing arm structure for the saddle riding electric vehicle according to claim 1,
    wherein a rotation axis of the electric motor is disposed at a center of the vehicle in a vehicle width direction.

6. The swing arm structure for the saddle riding electric vehicle according to claim 1,
    wherein, when a straight line passing through the pivot section and an axle of the rear wheel is set as a swing arm centerline in a side view,
    a rotation axis of the electric motor overlaps with the swing arm centerline in the side view.

7. The swing arm structure for the saddle riding electric vehicle according to claim 1, further comprising: a drive shaft that transmits a force from the speed reduction mechanism to the rear wheel,
    wherein the swing arm comprises an arm section in which the drive shaft passes through.

8. The swing arm structure for the saddle riding electric vehicle according to claim 7,
    wherein a cross section of the arm section crossing a longitudinal direction has a closed annular shape.

* * * * *